United States Patent
Patrick

[11] 3,948,303
[45] Apr. 6, 1976

[54] REPLACEABLE RESILIENT TIRE

[76] Inventor: Ernest G. Patrick, 14510 Burin Ave., Lawndale, Calif. 90260

[22] Filed: Jan. 28, 1974

[21] Appl. No.: 437,062

[52] U.S. Cl. .............................. 152/327; 152/329
[51] Int. Cl.² .......................................... B60C 7/24
[58] Field of Search ........... 152/323, 324, 325, 327, 152/328, 329, 318, 320, 339

[56] References Cited
UNITED STATES PATENTS

| | | | |
|---|---|---|---|
| 310,862 | 1/1885 | Leigh et al. | 152/323 |
| 582,453 | 5/1897 | Carr | 152/327 |
| 697,033 | 4/1902 | Stein | 152/329 |
| 1,719,218 | 7/1929 | Gammeter | 152/327 |
| 2,108,406 | 2/1938 | Kraft | 152/329 |

*Primary Examiner*—Drayton E. Hoffman
*Attorney, Agent, or Firm*—William C. Babcock

[57] ABSTRACT

A replaceable resilient tire particularly adapted for mounting on a wheel of a low velocity vehicle, such as a wheel chair, tricycle, bicycle and the like. The mounting of the tire on the rim of a wheel may be accomplished without the use of special tools, and by a person having little or no mechanical skill. The tire is of light weight, has a small transverse cross section, has good roll ability, and can be manufactured from a wide choice of extruded resilient rubber compounds or polymerized resins at a substantial saving of cost. A tensioned nylon rod of circular shape is disposed within the confines of the tire and exerts a radially directed force on the tire to maintain it in a fixed position on the rim.

1 Claim, 3 Drawing Figures

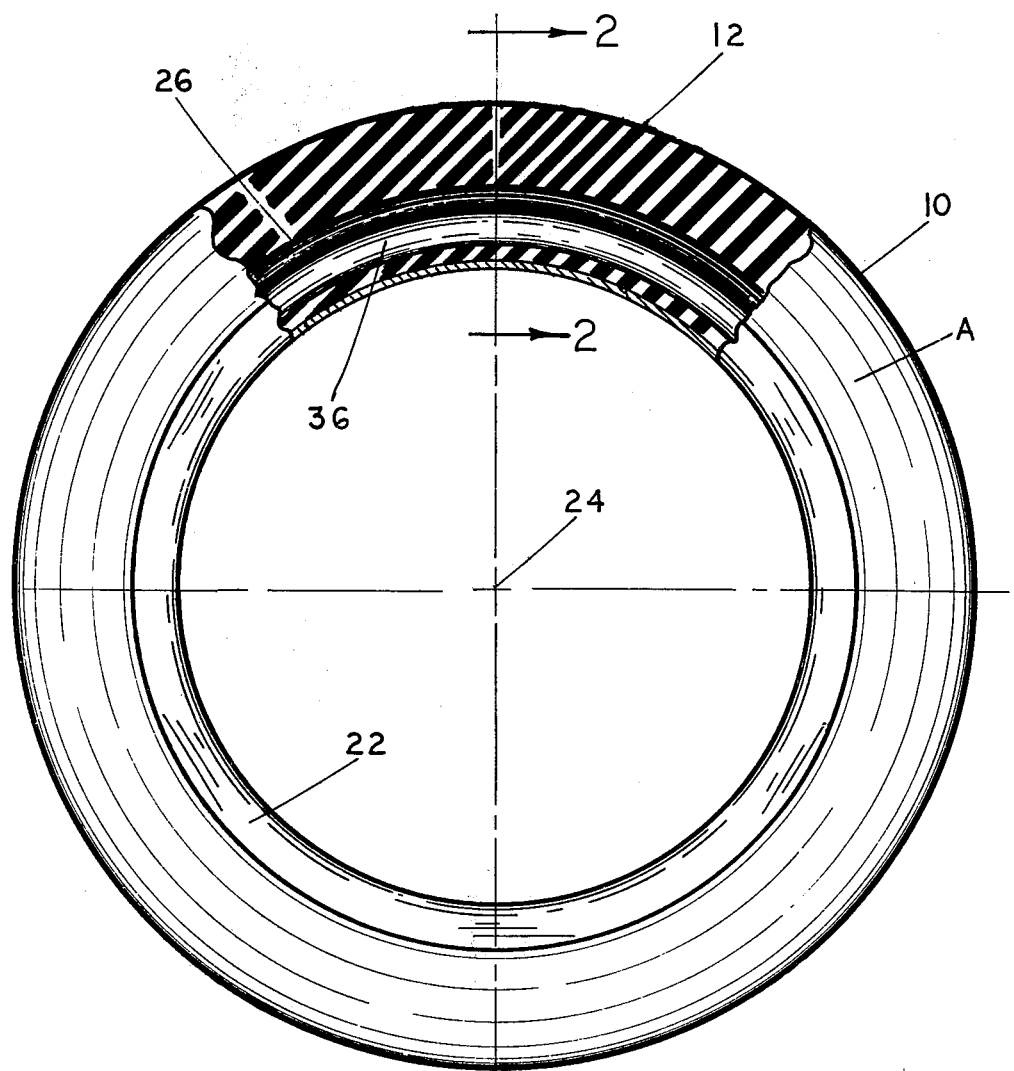
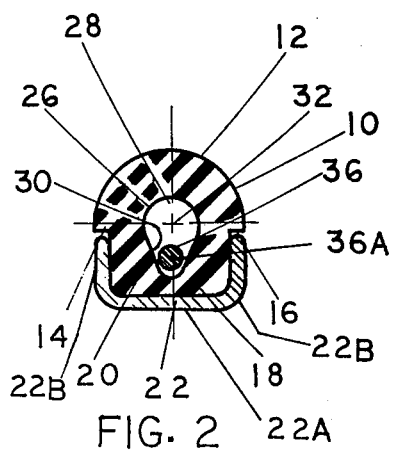
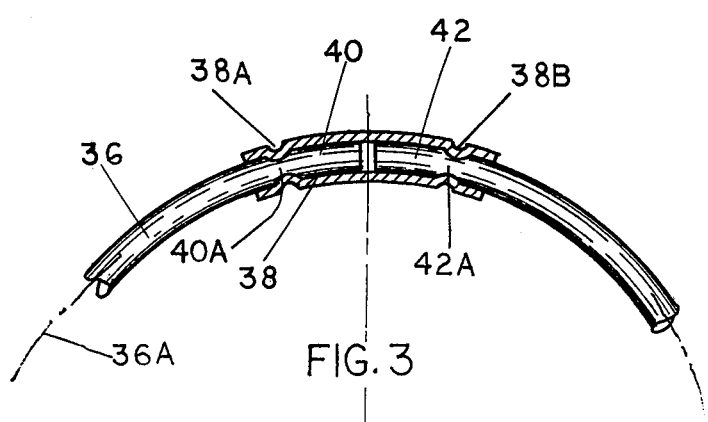

REPLACEABLE RESILIENT TIRE

BACKGROUND OF THE INVENTION

1. Field of the Invention
Replaceable Resilient Tire

2. Description of the Prior Art

In the past, it has been conventional on wheel chairs and other low velocity vehicles to use wired on tires, semi-pneumatic tires, and snap on tires containing a coil spring molded within the interior thereof. In the wired on tire, a length of wire surrounding or embedded in the tire rigidly secures the tire to the rim on which it is mounted. The replacement of a wired on tire by a user is extremely difficult, by the ordinary user, since special tools and a high degree of mechanical skill must be employed to remove the wired on tire from a rim and to install a new one in place thereof. Thus, the patient and or hospital must have a specially trained person capable of replacing and installing tires of this construction, or in lieu thereof incur the time and expense of sending the entire wheel chair back to the manufacturer for subsequent installation of one or both tires thereon.

To avoid the previously mentioned difficulties in installation or removal of wired on wheels, an alternative design known in the prior art as the semi-pneumatic tire has been used. This tire is a molded construction, which depends upon the strength and rigidity of the rubber to retain it on the wheel rim. However, this tire has proved to be unsatisfactory for numerous reasons. One reason is that the hard rubber used in the semi-pneumatic tire is not particularly resilient, and is very difficult to stretch in order to install the tire on the wheel rim or remove it therefrom. This lack of resiliency also may cause the tire to roll laterally from the rim, if the rubber is not sufficiently resilient to hold it in place thereon. A further disadvantage of the semi-pneumatic tire is that it is molded and is much heavier than an extruded tire.

Yet another operational disadvantage of the semi-pneumatic tire is that relatively hard rubber is employed to obtain the necessary strength therein, and this substantially reduces the cushioning effect that is expected from the tire.

The previously available snap on tire has a coil spring molded into the rubber, and as a result it is extremely difficult to place it on a rim, or remove it therefrom. The snap on tire, due to having a coil spring incorporated as a part thereof is much heavier, and is not as easily rollable as the tire of the present invention.

The primary purpose in devising the present invention is to provide a resilient tire for use on a wheel of a low velocity vehicle, and one that will be substantially free of the operational disadvantages of prior art tires used for this purpose.

A further object in devising the present invention is to provide a resilient tire that is easy to place on or remove from a rim, has good roll ability, has a good cushioning effect on the vehicle with which it is associated, can be fabricated from an extruded resilient material such as rubber containing compound or polymerized resin, and one that does not require special tools or special ability on the person that is to mount the tire on a rim or remove it therefrom.

SUMMARY OF THE INVENTION

The tire is defined by an elongate body of a resilient material such as a rubber compound or a polymerized resin that is disposed in a circular configuration, and with the body having a longitudinal passage therein in which a rod of tensioned nylon is disposed to exert both radial and hooped tension on the tire when the latter is disposed on the rim. The longitudinal center line on the rod of nylon when the tire is mounted on the rim, is disposed inwardly from the outer extremities of the flanges that form a part of the rim, and as a result the tire cannot be inadvertently displaced from the rim when subjected to substantial lateral forces. The abutting ends of the rod of nylon are secured together by a surrounding sleeve of a rigid permanently deformable metal or plastic which is crimped or bonded to the nylon to hold the adjacent end portions of the nylon in fixed longitudinal spacing relative to one another. It will be apparent that other plastic material may be used in lieu of nylon, but nylon has been found to be extremely satisfactory for use in the present invention.

BRIEF DESCRIPTION OF THE DRAWINGS

FIG. 1 is a side elevational view of the tire, partially in cross section, and showing the internal structure of the tire;

FIG. 2 is a transverse cross sectional view of the tire and supporting rim taken along the line 2—2 in FIG. 1; and FIG. 3 is an isolated fragmentary side elevational view of the adjacent end portion of the nylon rod, and the sleeve used in securing the same together when the rod of nylon is disposed in the tire shown in FIG. 1.

DESCRIPTION OF THE PREFERRED EMBODIMENT

A tire A shown in FIG. 1 is defined by an elongate body 10 of a resilient rubber containing compound or a suitable resilient polymerized resin, with the body being positioned in a circular configuration, and having the free ends thereof in abutting contact. Body 10 includes an outer peripheral portion 12 of semi-circular transverse cross section that defines first and second laterally spaced shoulders 14 and 16 from which a rectangular portion 20 extends inwardly. The innermost part of portion 20 defines a cylindrical bearing surface 18.

A rim 22 is provided that is defined by a cylindrical web 22a of substantial width that has two flanges 22b extending outwardly from the circumferential edges thereof. The exterior surface of the web 22a and interior surfaces of flanges 22b cooperate to define a circumferentially extending space of such transverse cross section as to permit the tire body portion 20 to be removably disposed therein. The bearing surface 18 of body portion 20 is in contact with the exterior surface of web 22a, and the first and second body shoulders 14 and 16 adjacently disposed to the outer edges of flanges 22b as shown in FIG. 2.

A circumferentially extending passage 26 is formed in the body 10, with the passage being of transverse tear-shaped cross section. The passage 26 includes a semi-cylindrical surface portion 28 shown in FIG. 2 from which two converging sidewalls extend inwardly to define an apex containing V-shaped surface portion 30 that is preferably substantially disposed within the tire portion 20. The mass distribution of material in body 10 is substantially equal about a circular center line 32 which defines the radius of curvature of surface 12.

A rod 36 of nylon or a rod of like material is initially threaded through passage 26, and thereafter the ends 40 and 42 of rod 36 are adjacently positioned as shown in FIG. 3. Sections of rod 36 adjacent ends 40 and 42 have circumferential grooves 40a and 42a formed therein.

A tubular sleeve 38 is provided that is formed from a permanently deformable metal and the sleeve being of such size as to snugly and slidably engage the adjacent end sections of rod 36 as shown in FIG. 3. Longitudinally spaced circumferential sections 38a and 38b of sleeve 38 are crimped inwardly as shown in FIG. 3 to hold the rod 36 in a circular configuration within body 10 to have the free end of the body (not shown) in abutting contact. Rod 36 is preferably of circular transverse cross section and of such size as to be disposed in the V-shaped portion 30 of the passage 26. When the rod 36 is so disposed the circumferential center lines 36a thereof is positioned below the outer extremities of flanges 22b, and the tire A will not be inadvertently displaced from rim 22 by lateral forces exerted on the tire.

The sleeve 38 and rod 36 cooperate to maintain the free ends (not shown) of body 10 in abutting contact, and with the sleeves 38 and rod 36 being longitudinally tensioned and in pressure abutting contact with the V-shaped portion 30 of passage 26.

The tire A is mounted on rim 22 by inserting a circumferential section of the rectangular portion 20 thereof in the space defined by the web 22 and flanges 22b. The balance of the tire A is then manually stretched to be disposed within the above mentioned circumferentially extending space. Tire A is removed from rim 22 by reversing the above described process.

The structure and use of the tire A has been described previously in detail and need not be repeated.

What is claimed is:

1. A resilient tire capable of being removably mounted on a rim defined by a circular web of substantial width that has a pair of laterally spaced flanges projecting outwardly from the edges thereof, said web and flanges cooperating to define a circumferentially extending space therebetween, said tire including:

a. an elongate flexible body having first and second ends, said body having a transverse cross section that includes an inner section of such shape as to fit snuggle within said space and an outer section of a generally semi-circular shape, said inner and outer sections defining a pair of laterally spaced shoulders at their junction, said body having a longitudinal passage therein of tear shape transverse cross section that has the portion of narrowest width thereof in said inner section, and said body of such length that when said first and second ends are in abutting contact the innermost surface of said first section is substantially the same diameter as the part of the external surface of said web with which it will be aligned when said body extends circumferentially about said rim to define said tire thereon;

b. a rod of resilient polymerized resin that is disposed in said passage, said rod having first and second ends in which first and second transverse circumferential grooves are formed, said rod when said first and second ends thereof are adjacently positioned holding said first and seconds of said elongate body in abutting contact, and said rod having a longitudinal centerline that is disposed inwardly from the other extremities of said flanges when said body is disposed on said rim with said first and second ends in abutting contact to define said tire; and c. fastening means disposable within said passage to hold said first and second ends of said rod adjacently disposed, with said body, rod, and fastening means when disposed on said rim to define said tire not being laterally displaceable therefrom due to said centerline of said rod being inwardly disposed from the outer extremities of said flanges and said fastening means is a tubular sleeve disposed in said passage and extending over adjacent sections of said length in which said grooves are formed, said sleeve being defined by a permanently deformable material, and said sleeve including first and second transverse circumferential portions that by pressure are deformed inwardly to engage said grooves to maintain said first and second ends of said length adjacently disposed.

* * * * *